J. T. REEVES.
WRENCH.
APPLICATION FILED AUG. 6, 1913.
1,095,519.
Patented May 5, 1914.
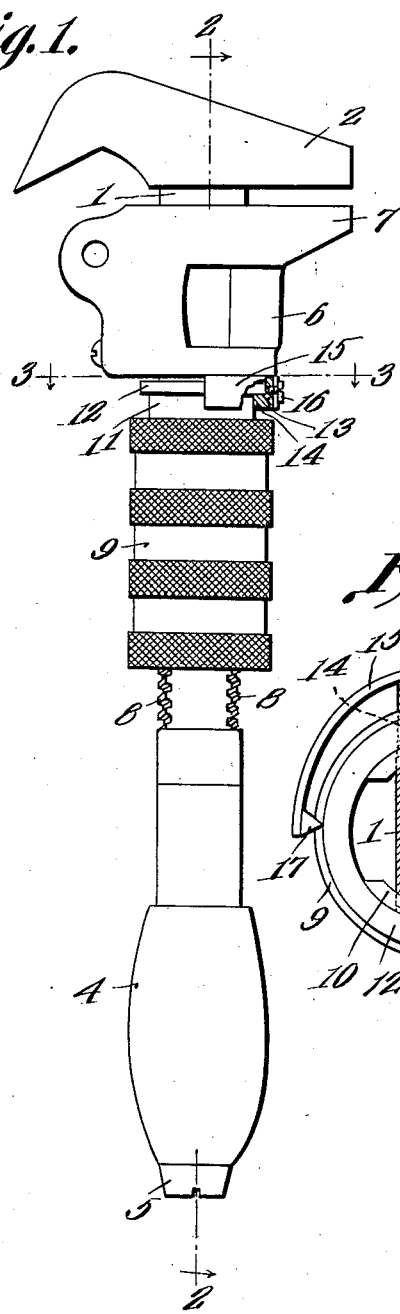
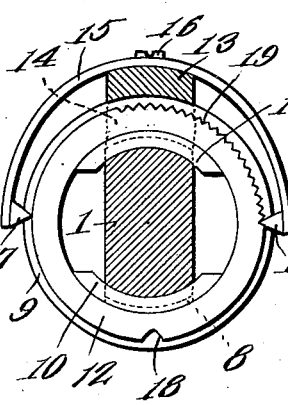
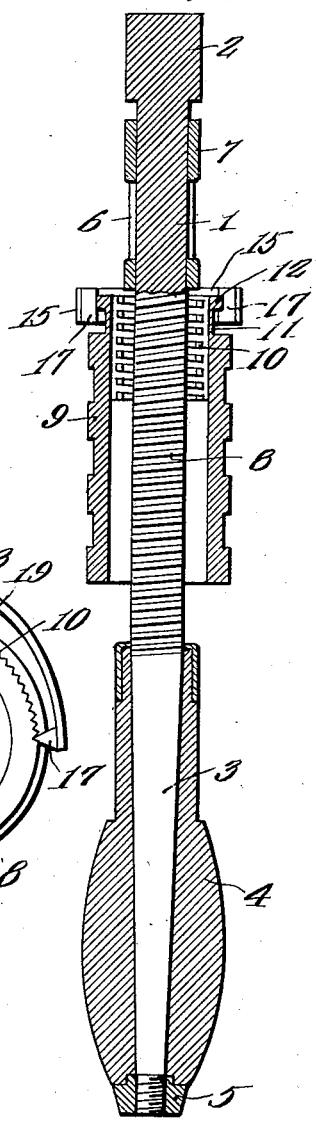
Witnesses
John T. Reeves,
Inventor
by C.A. Snow & Co.
Attorneys

UNITED STATES PATENT OFFICE.

JOHN TIMOTHY REEVES, OF GRANT, OKLAHOMA, ASSIGNOR OF ONE-HALF TO BURGOYNE BROS., OF HUGO, OKLAHOMA.

WRENCH.

1,095,519.  Specification of Letters Patent.  Patented May 5, 1914.

Application filed August 6, 1913. Serial No. 783,380.

*To all whom it may concern:*

Be it known that I, JOHN T. REEVES, a citizen of the United States, residing at Grant, in the county of Choctaw and State of Oklahoma, have invented a new and useful Wrench, of which the following is a specification.

The present invention appertains to wrenches, and aims to provide a novel and improved wrench having a movable jaw capable of quick adjustment.

One of the objects of the present invention is to provide a nut mounted upon the stock or shank of the wrench, the nut and stock having peculiar interengageable threads whereby the nut may be quickly adjusted along the stock to adjust the movable jaw, and to lock the same at any adjustment.

Another object of the present invention is to provide a unique operative connection between the adjustable nut and the movable jaw, including means for yieldably locking the nut at various positions.

With the foregoing and other objects in view, which will be apparent as the nature of the invention is better understood, the present invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawing, wherein:—

Figure 1 is a side elevation of the wrench, parts being broken away. Fig. 2 is a longitudinal section of the wrench, taken on the line 2—2 of Fig. 1. Fig. 3 is an enlarged cross section taken on the line 3—3 of Fig. 1.

In carrying out the present invention, reference being had in detail to the drawing, there is provided a stock, shank or stem 1 of a rectangular cross section, having the stationary jaw 2 at its upper or outer end, and having its other or inner end tapered, as at 3. A wooden or other handle 4 has a longitudinal tapered opening receiving the tapered portion 3 of the stock, a nut 5 being threaded on the end of the tapered portion 3 to secure the handle in position. A slide or follower 6 is slidable upon the stock 1 to and from the stationary jaw 2, and carries the movable jaw 7 which coöperates with or complements the jaw 2. The edges of the stock 1 are curved or convexed beyond or above the handle 4, and are provided with the threads 8, which are disposed diagonally, or spirally with respect to the stock. A cylindrical or sleeve nut 9 is mounted on the stock below the slide 6, and is provided with the internal opposed threads 10, which are disposed diagonally or spirally with respect to the nut and the stock, so as to coöperate with the mutilated threads 8 of the stock. The ends of the mutilated threads 10 lie in parallel planes, as clearly seen in Fig. 3, in order that an opening will be provided between the threads 10 for accommodating the stock when the nut and stock are properly adjusted with respect to one another. The upper end of the handle 4 is preferably reduced, in order that the nut 9 may move over the said end of the handle, when the nut is slid away from the stationary jaw, which provides a compact arrangement, without excessively trammeling the adjustment of the movable jaw. The outer or upper end of the nut 9 is reduced, as at 11, and the reduced portion 11 is provided with an integral collar 12, while the slide 6 is provided with an integral depending or inwardly projecting extension or hook 13 having a lug or tip 14 engaging under or over the collar 12 whereby the nut and slide are constrained to move in unison along the stock, the nut, however, being permitted to rotate with respect to slide or movable jaw.

An arcuate or semi-circular leaf spring 15 is secured at its intermediate portion to the outer side or back of the extension 13, by means of a screw or other securing member 16, the ends or terminals of the spring 15 straddling the collar 12, and bearing pawls or dogs 17 engaging the opposite sides of the collar 12. The collar 12 is provided with a deep notch 18, at one side, or adjoining one set of threads 10, and is provided at its other or opposite side with a series of small ratchet notches 19. The notch 18 is so disposed, that when the nut is rotated to bring the threads 10 at the sides of the stock, one or the other of the pawls or dogs 17 will snap into the notch 18 to lock the nut in the said position, whereby the nut and movable jaw may be slid longitudinally upon the stock.

The present wrench is quickly adjustable, and is otherwise of advantage. To adjust the movable jaw, it is merely necessary to rotate the nut 9, until the notch 18 is engaged by the respective pawl or dog 17, whereby the threads of the nut will disengage the threads of the stock, in order that the nut may be slid longitudinally to correspondingly adjust the movable jaw. Thus, the movable jaw may be readily slid toward the stationary jaw, so that an object may be gripped between the two jaws, and after the movable jaw has been moved against the object to be gripped, the nut is rotated properly so as to engage the threads 10 with the threads of the stock. It is to be observed that when the nut is rotated counter-clockwise as seen in Fig. 3, the threads 10 will travel upwardly slightly upon the threads of the stock, to tightly clamp the movable jaw against the object gripped. When the movable jaw is locked in position, the notch 18 and the series of notches 19 stand between the respective pawls 17, and serve as indices for properly setting the nut, as will be apparent. To release the movable jaw, the nut is rotated in a reverse or retrograde manner, so as to slightly draw the movable jaw away from the object clamped, until the notch 18 is engaged by one of the pawls, in which event, the nut together with the movable jaw may be slid away from the stationary jaw. It is to be noted that when the nut is rotated to either engage or release the stock, one or the other of the pawls 17 will be engaged by the series of notches 19, thereby producing a series of audible clicks for assisting in properly positioning the nut. Thus, the deep notch 18 of the collar is engageable by one of the dogs or pawls 17 when the threads of the nut and stock are disengaged, and the series of ratchet notches 19 opposite the deep notch are engageable with the other dog or pawl when the nut is swung into and out of engagement with the mutilated threads of the stock.

Having thus described the invention, what is claimed as new is:—

In a wrench, a stock having a jaw at one end, a nut mounted on the stock, the stock and nut having interengageable mutilated threads, a follower slidable on the stock and having a jaw coöperating with the aforesaid jaw, the adjoining ends of the nut and follower having an interengaging collar and hook, respectively, and a semi-circular leaf spring having its intermediate portion secured to the back of the said hook and having terminal dogs engaging the opposite sides of the said collar, the collar having a deep notch engageable by one of the dogs when the threads of the nut and stock are disengaged, and having an opposite series of ratchet notches engageable with the other dog when the nut is swung into and out of engagement with the mutilated threads of the stock.

In testimony that I claim the foregoing as my own, I have hereto affixed my signature in the presence of two witnesses.

JOHN TIMOTHY REEVES.

Witnesses:
L. G. WEBB,
L. H. MERRIT.